(12) United States Patent
Morrow

(10) Patent No.: US 11,768,997 B2
(45) Date of Patent: Sep. 26, 2023

(54) SYSTEMS AND METHODS FOR CREATING, USING, AND MANAGING FIELDS IN ELECTRONIC CONTENT

(71) Applicants: Atlassian Pty Ltd., Sydney (AU); Atlassian Inc., San Francisco, CA (US)

(72) Inventor: Dugald Morrow, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 169 days.

(21) Appl. No.: 16/836,323

(22) Filed: Mar. 31, 2020

(65) Prior Publication Data

US 2021/0303776 A1    Sep. 30, 2021

(51) Int. Cl.
*G06F 40/00* (2020.01)
*G06F 40/166* (2020.01)
*G06F 40/279* (2020.01)
*G06F 40/242* (2020.01)

(52) U.S. Cl.
CPC .......... *G06F 40/166* (2020.01); *G06F 40/242* (2020.01); *G06F 40/279* (2020.01)

(58) Field of Classification Search
CPC ..... G06F 40/166; G06F 40/279; G06F 40/242
See application file for complete search history.

(56) References Cited

U.S. PATENT DOCUMENTS 5,761,689 A * 6/1998 Rayson .................. G06F 40/232
715/210
6,047,300 A * 4/2000 Walfish ................. G06F 40/232
715/257
6,122,647 A * 9/2000 Horowitz .............. G06F 16/954
707/999.005
6,769,096 B1 * 7/2004 Kuppusamy ............ G06F 16/94
707/999.01
6,895,554 B2 * 5/2005 Endress ................ G06F 40/174
715/255

(Continued)

OTHER PUBLICATIONS

Tutorials Point, "Auto Correction in Word 2010", 2014, 4 pages https://web.archive.org/web/20141009214322/https://www.tutorialspoint.com/word/word_auto_correction.htm.*

(Continued)

*Primary Examiner* — William L Bashore
*Assistant Examiner* — David Faber
(74) *Attorney, Agent, or Firm* — Brownstein Hyatt Farber Schreck, LLP

(57) ABSTRACT

Systems and methods for creating, inserting, and managing a field. The field comprising a key and a corresponding formula. The key and the formula of the field stored in a database of a field management system. The method for inserting the field including receiving a field insertion request; identifying and forwarding, by the field management system, one or more keys and formulas corresponding to one or more suggested fields for rendering on a user interface of a client device; receiving, at the field management system, indication of selection of a key from the one or more keys; computing, by the field management system, a result for the formula of the field associated with the selected key; and communicating the result from the field management system to the first client application for rendering in line with the electronic content.

19 Claims, 8 Drawing Sheets

(56) References Cited

U.S. PATENT DOCUMENTS

| | | | | |
|---|---|---|---|---|
| 8,938,669 | B1* | 1/2015 | Cohen | G06Q 10/101 |
| | | | | 709/204 |
| 9,229,919 | B1* | 1/2016 | Krappe | G06F 40/197 |
| 9,619,454 | B2* | 4/2017 | Wang | G06F 3/04883 |
| 10,311,140 | B1* | 6/2019 | Simonson | G06F 16/2379 |
| 2005/0125217 | A1* | 6/2005 | Mazor | G06F 40/232 |
| | | | | 704/1 |
| 2005/0283468 | A1* | 12/2005 | Kamvar | G06F 16/3325 |
| 2006/0282818 | A1* | 12/2006 | DeSpain | G06F 40/18 |
| | | | | 717/109 |
| 2007/0055926 | A1* | 3/2007 | Christiansen | G06Q 10/10 |
| | | | | 715/244 |
| 2008/0066052 | A1* | 3/2008 | Wolfram | G06F 3/01 |
| | | | | 717/109 |
| 2008/0295101 | A1* | 11/2008 | Vicars | G06Q 10/10 |
| | | | | 707/E17.008 |
| 2009/0055733 | A1* | 2/2009 | Graeber | G06Q 10/06 |
| | | | | 715/271 |
| 2011/0080409 | A1* | 4/2011 | Lee | G06F 40/111 |
| | | | | 345/467 |
| 2013/0061139 | A1* | 3/2013 | Mahkovec | G06F 40/232 |
| | | | | 715/257 |
| 2014/0173400 | A1* | 6/2014 | Mingot | G06F 16/95 |
| | | | | 715/212 |
| 2014/0372854 | A1* | 12/2014 | Otero | G06F 40/18 |
| | | | | 715/219 |
| 2015/0356314 | A1* | 12/2015 | Kumar | G06F 21/6245 |
| | | | | 713/165 |
| 2016/0026730 | A1* | 1/2016 | Hasan | G06F 16/986 |
| | | | | 715/234 |
| 2017/0193412 | A1* | 7/2017 | Easton | G06Q 10/06313 |
| 2018/0032499 | A1* | 2/2018 | Hampson | G06F 40/232 |

OTHER PUBLICATIONS

Gookin, Dan, "How to Save a Document in Word 2016", May 31, 2018, 2 pages.*

Gookin, Dan, "How to Open a Document in Word 2016", Feb. 11, 2017, 2 pages.*

Childress, "How to Track Stock Data in Google Sheets—WithGooglefinance Function", Feb. 28, 2017, 15 pages.*

* cited by examiner

SYSTEMS AND METHODS FOR CREATING, USING, AND MANAGING FIELDS IN ELECTRONIC CONTENT

TECHNICAL FIELD

Aspects of the present disclosure are directed to the creation and/or management of fields in electronic content.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Some document creation applications allow for the use of fields in documents in order to indicate a current page number or other data specific to the current document. However, traditional fields may be rendered inoperable or static of the document is exported or viewed with a different application. The systems and techniques described herein are directed to the creation and/or management of fields in electronic content that may not have some of the drawbacks of traditional systems.

Figure 1:
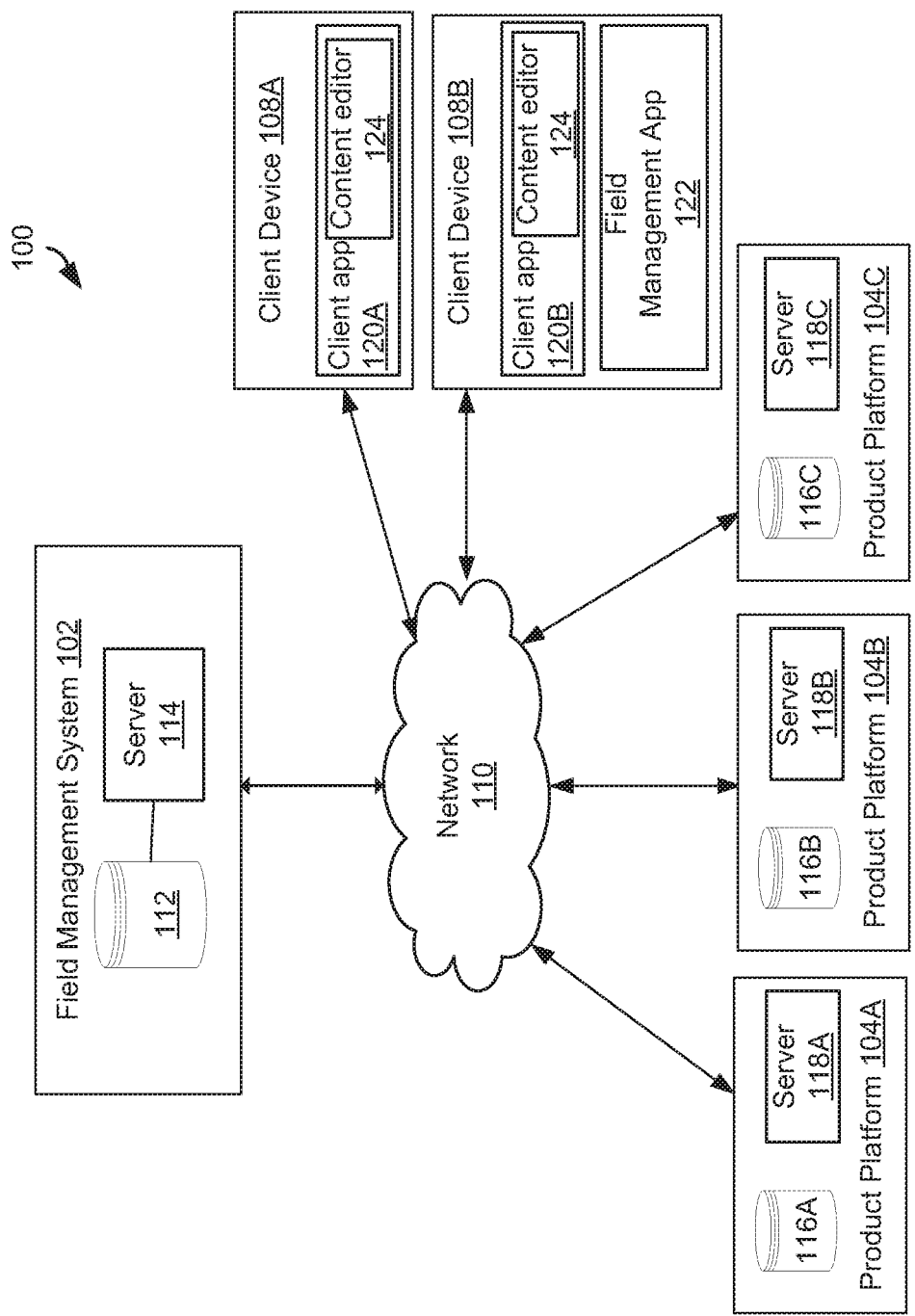
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

A document creation and/or management application may allow a uses to insert fields in a document. A field is typically a placeholder that stores and displays data. A field can perform simple tasks such as returning the current date or current page number—which can dynamically change based on the date the document is accessed or the number of pages added before or after that particular page of the document. Further, fields can be used to insert data specific to a document, e.g., a title of the document, an index based on the headings in a document, etc. If the title of the document or the headings subsequently change, the corresponding field value is automatically updated. This way data that needs to be updated constantly (such as dates and page numbers) or data that is referenced multiple times in a document can be automatically updated without the user having to manually update each instance.

However, fields provided by most document processing and/or management applications have potential issues. In particular, the fields are generally not transportable and/or confined to the predefined parameters offered by the document processing and/or management applications.

To address one of more of these issues, embodiments of the present disclosure introduce fields that can be inserted in any content created by a user such as documents, comments, chat messages, etc. and systems and methods for creating and storing custom fields that can subsequently be used across platforms and content.

The term "fields" may be used to refer to elements that can be entered into electronic content by a user. Generally speaking, a field includes a key (by which the field is identified and accessed) and a corresponding formula (which determines what ends up appearing in the electronic content). When a user wishes to add a field, they simply enter the key of the field directly into the content, e.g., via a content editor, and the result of the formula associated with that key can be automatically inserted in the content in place of the key. Thereafter, whenever the content is rendered, the content is automatically updated with the result of the formula associated with the fields identified in the rendered content.

In certain embodiments, fields can be created by users. In other embodiments, fields can be automatically created by product applications. These fields (created by users and/or product platforms) can be stored in and accessed from a central repository. Importantly, once a field is created, it can be used by multiple users across multiple product platforms (oftentimes irrespective of the particular product platform a field is actually created in). For example, a field may be created by a user while adding content to a wiki page. That field is then stored in the central repository and can then be used by that (or other users) when performing other tasks on other product platforms—e.g. when creating a message in a chat room on a messaging platform, when adding a comment to an issue in an issue tracking system, etc. Similarly, fields can be utilized by multiple application platforms. That is, a field created by one application may be consumed by another application. For example, a document statistics application may create a #wordCount field, which may be consumed by an application that displays the "reading time" of a page.

Further, the formula associated with a field can be a simple text, numeric, date/time value. In other embodiments, the formula of a field may or may not depend on other fields. For example, in a table, a field may be "Average=Total/Count". In this case, the term "Total" can also be a field such as "Total=sum(above( ))", where "sum(above( ))" is a function inserted in a particular cell of the table that calculates a sum of all the values above that cell in the column of the table in which the "Total" field is inserted. In this case, whenever the Average field is called, the Total value is first calculated and then the Average value is calculated based on the freshly calculated Total value. In still other examples, the formula of a field can be an iteration or search query. In these cases, a result of the formula is computed and the result of the formula is rendered in the content when a particular field is inserted in the content and/or when a dependent field changes. Fields can also be defined such that a particular application needs to be invoked to compute the result of the field. For example, a field called "stockprice" having a formula that includes variables derived from the Forex application can be defined with the intention of being implemented by one or more applications. When computing the result of this field for a given stock, the implementing application can look up the installed apps to find the Forex application. Without any application installed, the system may compute the field using a basic implementation such as one that has a delay in stock price values. For cases where no default computation is provided, the field computation may result in an error. Applications can also define fields. For example, an application may define a field called "covid19Cases" which has a formula with two variables—region and date range. When the result of this field is computed, it may return the number of new covid-19 cases reported in a given region.

It will be appreciated that the field formulas may act upon and compute various kinds of data such as numbers, Booleans, collections of numbers, text, dates or time. An example of numeric data includes: #sandwhichCost=#butterCost+#breadCost+#vegemiteCost. An example of Boolean data includes: #reimbusableAmount=(#spentAmount>#maxAmount)? #maxAmount: #spentAmount. Examples of collection data include: #medianHeight=median(#height1, #height2, . . . , heightN) or #medianAbc=median(above( )). An example of Text data includes: #productVersionName=#productName+"v"+#productVersion.

In some embodiments, a field that is inserted in content once can be copied and pasted elsewhere in the same content or in some other content. This case may result in a new field being automatically created based on equivalent relationships between the formula of the field and any external fields associated with the pasted field, the formula of the pasted field can be recalculated based on the particular content where the field is pasted. For example, consider the content, "3 days for 5 people each charging $10 per day will cost $150." In this case, the results "3" "5", "$10" and "$150" correspond to formulas defined as "#days=3", "#people=5", "#cost-per-day=$10" and "#total-cost=#people*#days*#cost-per-day". If this content is copied and pasted elsewhere in the same document or another document, the same text is pasted, but all the fields are duplicated (e.g., as "#daysCopy=3", "#peopleCopy=5", "#cost-per-dayCopy=$10" and "#total-costCopy=#peopleCopy*#daysCopy*#cost-per-dayCopy") so that any of the formulas can change, e.g., depending on the formulas of one or more of the fields in the context of the new document. It will be appreciated that fields can also be copied when they refer to fields not contained in the section being copied. For example, consider the content, "3 days for 5 people cost $150." In this case, the results "3" "5" and "$150" correspond to fields defined as "#days=3", "#people=5" and "#total-cost=#people*#days*#cost-per-day" where the field "#cost-per-day=$10" is not contained in the quoted text section. If this content is copied and pasted elsewhere, the same text is pasted and the fields are duplicated (e.g., as "#daysCopy=3", "#peopleCopy=5" and "#total-costCopy=#peopleCopy*#daysCopy*#cost-per-day") except for the "#cost-per-day=10" field since this is not contained in the text being copied.

Further, it will be appreciated that fields can be located anywhere within a document, including in document metadata. They are not constrained to any particular section of a document. Further still, in some cases, a field could be created, but not inserted/exposed in the content of the document. For example, in the context of a document, an interest rate or time period field may be created, but not inserted in the content. Instead, another field that displays a total amount of interest may be inserted in the content that references the interest rate and/or time period fields.

These and other aspects of the present disclosure will be described in detail with reference to FIGS. 1-9 below.

Environment Overview

FIG. 1 illustrates an environment 100 in which one or more aspects of the present disclosure are implemented. Specifically, FIG. 1 illustrates the systems involved in creating, maintaining, and managing fields. The systems include a field management system 102, product platforms 104A, 104B, and 104C, and client devices 108A and 108B. The field management system 102, product platforms 104A, 104B, and/or 104C, and client devices 108A and/or 108B communicate with each other over one or more communication networks 110.

The field management system 102 is configured to create, store and manage fields. To that end, the field management system 102 includes a management server 114 and a database 112. The server 114 is configured to primarily communicate with the product platforms 104A, 104B, and/or 104C. In particular, it is configured to communicate with the product platforms 104A, 104B, and/or 104C to service requests for adding, creating, editing, and refreshing fields. In addition, the product platforms 104A, 104B, and/or 104C may be configured to communicate with the server 114 for subscribing to field changes (i.e., to receive any changes in a field that is actively used by the product platforms 104A, 104B, and/or 104C). To a lesser extent, the field management system 102 may also be configured to communicate directly with the client devices 108A and/or 108B. This may be done when client devices 108A and/or 108B directly send service requests to the field management system 102 for creating or editing fields. It may also be configured to service requests for browsing and managing fields.

The database 112 is configured to store field data (which includes the key, formula, and metadata associated with each field maintained by the field management system 102). Fields can be searched based on the metadata.

In general, each product platform 104A, 104B, and/or 104C is a system entity that hosts one or more software applications and/or content. Each platform 104A, 104B, and/or 104C may include one or more servers 118A, 118B, and/or 118C for hosting corresponding software application(s) and one or more databases 116A, 116B, and/or 116C for storing application specific data. Examples of software applications hosted by product platforms 104A, 104B, and/or 104C may include interactive chat applications (e.g., SLACK, MICROSOFT TEAMS), collaborative applications (e.g., CONFLUENCE), software code management system (e.g., BITBUCKET), and issue tracking applications (e.g., JIRA). JIRA, CONFLUENCE, and BITBUCKET are all offered by Atlassian, Inc. It will be appreciated that the software applications need not be offered by the same organization and that the presently disclosed invention can be used with any product platform configured to interact with the field management system 102.

In order to run a particular application, a server (e.g., the server 118A, 118B, and/or 118C) includes one or more application programs, libraries, APIs, or other software elements that implement the features and functions of the application. In one example the servers 118A, 118B, and/or 118C include a content rendering module (not shown) which provides content rendering functionality as described in detail below.

The product platforms 104A, 104B, and/or 104C also store product data. Product data generally includes: data defining the operation of the hosted application (for example, user accounts, user permissions, and the like); and application data (i.e., the content hosted/maintained by the application, which can be, for example, issue data (in JIRA), page/document data (in CONFLUENCE), conversation and chatroom history (in STRIDE), etc.). The data is stored on and managed by databases 116A, 116B, and/or 116C. Databases 116A, 116B, and/or 116C are provided by a database server or servers which may be hosted by servers 118A, 118B, and/or 118C, but are more typically hosted on a separate physical computer in communication (directly or indirectly via one or more networks) with the servers 118A, 118B, and/or 118C.

While single server architecture has been described herein, it will be appreciated that one or more of the product platforms 104A, 104B, and/or 104C can be implemented using alternative architectures. For example, in certain cases a clustered architecture may be used where multiple server computing instances (or nodes) are instantiated to meet system demand Conversely, in the case of small enterprises with relatively simple requirements a product platform 104A, 104B, and/or 104C may be a stand-alone implementation (i.e., a single computer directly accessed/used by the end user).

Client devices 108A and/or 108B may be any device suitable for performing client-side operations described herein, for example a mobile device (e.g. a tablet or mobile phone), a portable device (such as laptop computer), or any other computing device (e.g. a desktop computer).

Generally speaking, users of client devices 108A and/or 108B are associated with one or more user accounts and generate and/or communicate electronic content on one or more product platforms 104A, 104B, and/or 104C. This activity includes any type of user account interaction with the product platforms 104A, 104B, and/or 104C, including interaction with content and/or software applications hosted by the product platforms 104A, 104B, and/or 104C. Example interactions include accessing/viewing and/or contributing to one or more documents hosted by the product platforms, writing posts, commenting on content, visiting web pages, sharing, liking, or viewing content, communicating with user accounts in real-time chat interfaces, etc.

In order to allow users to perform these functions, as illustrated in FIG. 1, each client device 108A and/or 108B includes one or more client (software) applications 120A and/or 120B that are configured to access software applications made available by product platforms 104A, 104B, and/or 104C. In some cases, the client devices 108A and/or 108B may include a client application corresponding to each product platform 104A, 104B, and/or 104C the client device 108A and/or 108B has access to. In other cases, a single client application (e.g., a web browser) may be utilized to communicate with multiple product platforms.

The client applications 120A and/or 120B include instructions and data stored in the memory (e.g. non-transitory computer-readable storage media) of the client devices 102 on which the applications are installed/run. These instructions are executed by a processor of the client device 102 to perform various functions as described herein. By way of example, some functions performed by the client applications 120A and/or 120B include communicating with applications hosted by the product platforms 104A, 104B, and/or 104C, rendering user interfaces based on instructions received from those applications, and receiving inputs from users to interact with content hosted by product platforms 104A, 104B, and/or 104C.

In addition to client applications 120A and/or 120B that allow users to interact with product platforms 104A, 104B, and/or 104C, one or more of the client devices 108A and/or 108B may further include a client application (see field management application 122) configured to directly access the field management system 102. In this case, the field management application 122 may communicate with the field management system 102 to render/update a user interface based on instructions received from the field management system, and receive inputs from user accounts allowing users to interact with the field management system 102.

The client applications 120A and/or 120B include content editors 124, i.e., interfaces for allowing users to create content, such as webpages, issues, conversations, posts, comments, etc. In some cases, content editors may use an iframe element for the content creation area, when a user clicks in the iframe, they can enter text, images or any other content in the iframe and once the user is done, they can submit the content so that the particular user interface currently displayed can be updated with the content submitted by the user. Any known content editor may be implemented without departing from the scope of the present disclosure.

The client applications 120A and/or 120B and the field management application 122) may be implemented in various ways. For example, the client applications may be web browser applications (such as, for example, CHROME, SAFARI, INTERNET EXPLORER, OPERA) which access the applications hosted by the product platforms 104A, 104B, and/or 104C and/or field management system 102 via appropriate uniform resource locators (URL) and communicates with these systems via general world-wide-web protocols (e.g. HTTP, HTTPS, FTP). In this case, the web browser application is configured to request, render, and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 104A, 104B, and/or 104C and/or field management system 102 using defined application programming interface (API) calls.

As illustrated in FIG. 1, communications between the field management system 102, client devices 108A and/or 108B, and product platforms 104A, 104B, and/or 104C are via the communication network 110. The communication network 110 is depicted as a single network in FIG. 1 for ease of depiction. However, in actual implementation, the various systems illustrated in FIG. 1 may communicate with each other over different communication networks. For example, the field management system may communicate with the product platforms 104A, 104B, and/or 104C through a local area network (LAN), whereas it may communicate with the client devices via a public network (e.g., the Internet). Similarly, the product platforms 104A, 104B, and/or 104C may communicate with one or more client devices 108A and/or 108B via a LAN and with other client devices 108A and/or 108B via a public network without departing from the scope of the present disclosure. Furthermore, the field management system 102 and product platforms 104A, 104B, and/or 104C may communicate with each other over open web protocols such as (HTTPS, REST, and JWT).

It will be appreciated that although only two client devices (108A and 108B), and three product platforms (104A, 104B and 104C) have been depicted, in normal operation, many more client devices and product platforms may be connected to the field management system 102 through the network 110.

Hardware Overview

The operations/techniques described herein are implemented by one or more special-purpose computing systems or devices. For example, in environment 100: the field management system 102 may be provided by one or more computer systems; each product platform 104A, 104B, and 104C may be provided by one or more computer systems; and each client device 108A and 108B is a computer system.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
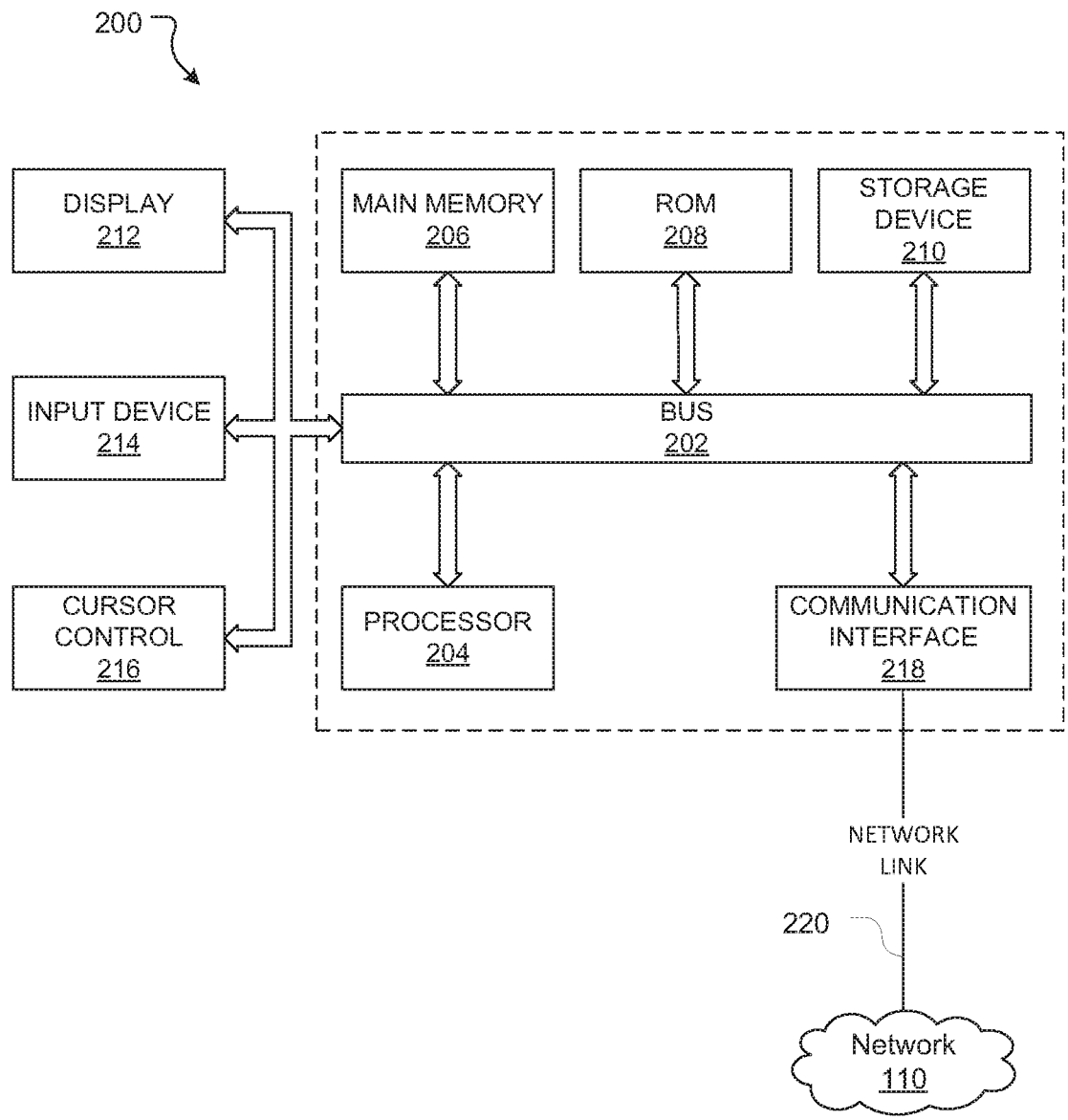
FIG. 2 is a block diagram of a computing system with which various embodiments of the present disclosure may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general-purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. If the computer system 200 is part of the field management system 102, the storage device 210 may store database 112.

In case the computer system 200 is the client device 108A and/or 108B, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example, touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio wave and infrared data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 110. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks 110 to other computing systems. For example, if the computing system 200 is part of the field management system 102, the network link 220 may provide a connection through network 110 to client devices 108A and/or 108B or product platforms 104A, 104B, and/or 104C.

Computer system 200 can send messages and receive data, including program code, through the network(s), network link 220, and communication interface 218. In the field management system example, the management server 114 may receive field requests from the product platform 104A, 104B, and/or 104C through the network 110 and communication interface 218.

The processor 204 of the service provider may execute the received access identifier as it is received, and/or store it in storage device 210, or other non-volatile storage for later execution.

Exemplary Data Structure for Fields

This section describes data structures employed by the field management system 102 to create and/or manage fields. The data structures and fields described are provided by way of example. Depending on the implementation, additional, fewer, or alternative fields may be used. Further, the fields described in respect of a given data structure may be stored in one or more alternative data structures (e.g. across multiple linked data structures). Further still, although tables are used to illustrate the data structures, the relevant fields/information may be stored in any appropriate format/structure.

As noted previously, users (on their client devices 108A and/or 108B and through an associated user account) may interact with content and/or applications hosted by one or more product platforms 104A, 104B, and/or 104C using a corresponding client application. Similarly, users may interact with the field management system via the field management application 122 on the user's client devices 108A and/or 108B. Using any one of these avenues, a user operating through a user account provides information to create a field.

When sufficient information is received, the client applications 120A and/or 120B or the field management application 122 generate a field descriptor for the field management system 102. As described below, the client devices 108A and/or 108B may automatically send this information to the field management system 102. In case the client applications 120A and/or 120B are utilized, the field descriptor is received from the corresponding product platform 104A, 104B, and/or 104C. Alternatively, if the field management application 122 is utilized, the field descriptor is received directly from the client devices 108A and/or 108B. The field management system 102 records relevant field information in the form of field records in one or more data structures. Each field record may store relevant information for a field.

For example, for a unique field record, the field management system 102 may store the following information:

An ID to uniquely identify the field (e.g., 38623).

A key/name for the field (e.g., Profit formula, Atlassian's Current IP patent Attorney). This field is entered or selected by users when they wish to insert fields in content or when fields are recommended to users.

In case the field has a simple formula, such as a text or numeric value, the value.

In case the field is for a formula or a search query, the formula or search query.

An identifier of the resource that owns the field—e.g., a Confluence page, a comment on an incident management platform, etc.).

An identifier of the container of the resource, e.g., a Jira project or a Confluence space.

A unit to identify where appropriate the unit of the formula (e.g., AU, meters, watts, etc.). In some embodiments, the unit may be provided by the user creating the field. In other embodiments, the unit may be automatically derived. For example, if a #Speed field depends on two other fields—#distance (in meters) and #duration (in seconds), the field management system may automatically determine that the unit of the #speed field is meters/second.

A category identifier. In certain cases, fields can be classified into different categories. This may be done, for example, for similar types of fields (e.g., fields associated with content metadata, fields associated with contextual current information, fields associated with formulas, or fields associated with queries, fields created by a particular author/team). In certain embodiments, a category is created and/or selected at the time of creating a field. Alternatively, default categories based on teams, activities, or keys may be created at a later stage (either automatically or manually) and one or more fields may be categorized under any of these categories. Using categories, field hierarchies may be created, allowing users to view fields nested within a particular category and drill down to a selected field.

Permissions to specify who is allowed to view/edit/delete the field.

A creation timestamp indicating the time the field was created.

An update timestamp indicating the time the field was last updated.

A classification of the discoverability of a field where, for example, public discoverability indicates the field will be returned in search results whilst reference discoverability means that users can utilize a field so long as the user has referenced the field.

A hierarchical namespace that allows named references to be simple and natural since references to other fields operate within the current namespace unless an alternate namespace is specified. This allows the same field names to be used in separate namespaces. Namespaces can exist corresponding to documents, document containers, products, teams, and other schemes.

A creator ID of the user/product that created the field.

A creator type field indicating the type of entity (e.g., a user, a product, an application, etc.) that created the field.

Formatting information. Formatting information that allows the computed result to be formatted in the context of units, locale and field specific preferences. For example, the formatting information may allow a date field to be displayed in a specific short form such as 27 Dec. 1968 or in accordance with the locale DD-MM-YYYY vs MM-DD-YYYY. Another formatting example may determine whether to display a result in imperial or metric units.

As described previously, one or more of the attributes mentioned about may be searchable.

The information associated with a particular record may be stored in various ways. For instance, the field management system 102 may store the field data in multiple interconnected data structures (e.g., the key and formula of a field may be stored in one data structure, and the authentication information for each field may be stored in a different linked data structure).

In addition, the field management system 102 may maintain other data structures to maintain records of the field requests it receives from client applications. This data may be used for example to identify the most recently used fields, the most popular fields for a particular user/team, the most popular fields in the organization, etc. It may also be used to identify fields that have not been used in some time—e.g., for deletion.

Table A illustrates an excerpt from an example field data structure maintained by the field management system 102:

TABLE A

| | | field data structure | | | |
|---|---|---|---|---|---|
| Field ID | Key | Formula | Owner ID | Project ID | Creation time |
| ... | ... | ... | ... | ... | ... |
| 126378 | Everest Height | 3489 | 2837 | Jk389 | 21 Mar. 2019 17:12:34 |
| 126379 | Profit | =SP/CP*100 | 8280 | Mb34 | 21 Mar. 2019 17:13:12 |
| 126380 | Total cost | = sum(#*-cost) | 283 | 87kh3 | 21 Mar. 2019 17:13:48 |
| 126381 | OKR scores | = "FOO" AND created >= "1-Jan-2020" | 92 | Dh34 | 21 Mar. 2019 17:17:18 |
| ... | | | ... | ... | ... |

The field management system 102 also maintains a dictionary of keys that includes for example, the key names for the fields maintained by the field management system 102 and their corresponding field ID. This dictionary may be utilized to identify one or more fields a user may be interested in (as described with reference to FIG. 5).

As noted, additional data structures and/or attributes to those shown above may be used in implementing the embodiments described herein. For example, while simple, mathematical, and query formulas are depicted as the same field in Table A above, these could be two or three different fields. Further, fields with simple formulas can be stored in one data structure whereas fields with mathematical or search query type of formulas can be stored in another data structure without departing from the scope of the present disclosure. Further still, the field data structure may also store the user ID of the creator of the field.

Exemplary Methods

This section describes various methods and processes for creating and managing fields. Generally speaking, the field creation and management processes can be split into a number of smaller processes—a process for creating a field, a process for inserting a field in content, a process for rendering content with a field, and a process for computing the formula of a field is disclosed. For descriptive purposes, each of these processes will be described independently. However, in some embodiments these processes can be joined, such that the output of one process is the input for another process.

Creating a Field

Figure 3:
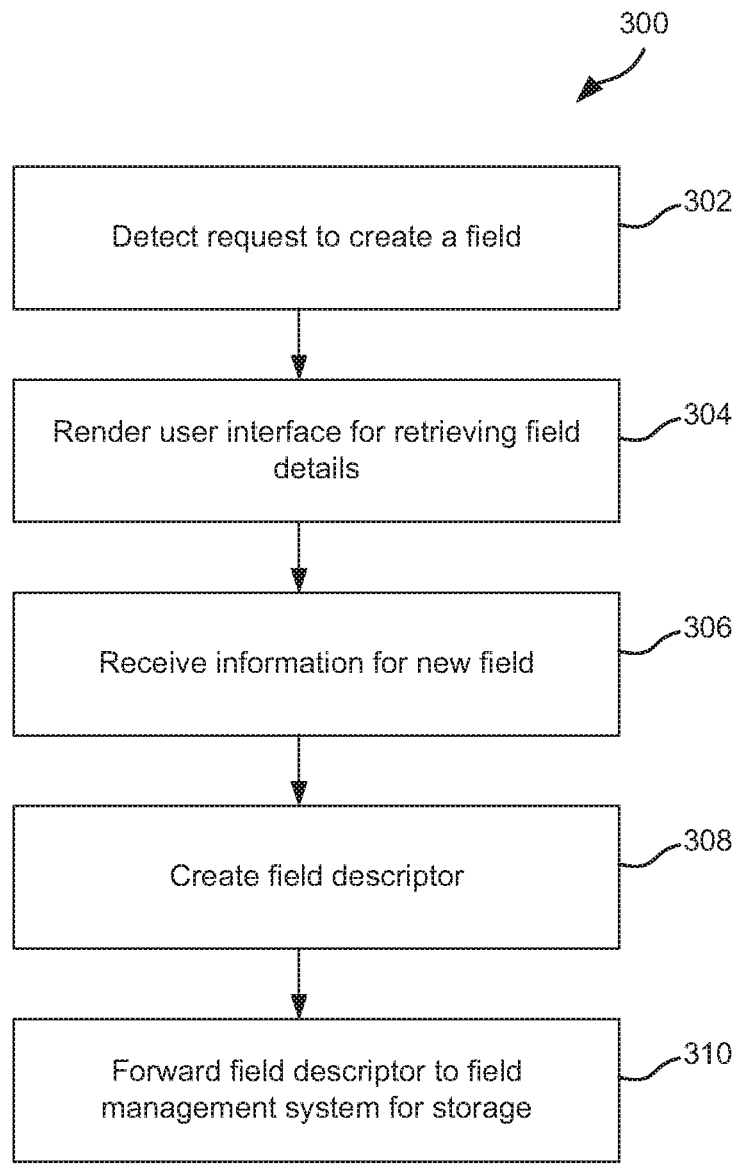
FIG. 3 is a flowchart illustrating a method for creating a field according to some embodiments of the present disclosure.

FIG. 3 illustrates an exemplary method 300 for creating a field. Although method 300 is described with reference to a single field, it will be appreciated that in practice this method can be repeated for creating other fields as well. Further, this method is described when a field is created using a client application such as application 120A that is associated with a particular product platform, such as product platform 104A. A similar process can be followed when the field is created using a client side application such as the field management application 122 associated with the field management system 102.

The method begins at step 302, where a request for creating a field is detected in the client application 120A and/or 120B. This may happen in a number of different ways. In one example, a user may be in the middle of creating content via a content editor (such as content editor 124) and may insert a special character (e.g., '=') or a sequence of special characters (e.g., '[ ]') in the content editor 124 to invoke the field creation process. In another example, the content editor 124 may include a graphical interactive element such as an icon or button, which may be activated to start the field creation process.

Next (step 304), the client application 120A and/or 120B renders a user interface for retrieving field details from the user. In some cases, the user interface may be in the form of a user form rendered over the currently displayed content. In other cases, for example, when the client device is a portable or mobile device, the client application 120A and/or 120B may direct the user to another page/webpage from the currently displayed content, which includes a user form to retrieve details.

At step 306, the client application 120A and/or 120B receives user input via the user interface. As a minimum to create a field, a key (name) and a formula are required. In other examples, the user interface can further include fields for specifying the unit of the formula result, for specifying whether the field is part of a category, and/or for specifying namespace, etc.

The key can be any meaningful name that can be easily recollected or can provide some indication of what the field represents. As previously described, if the formula of the field is simple, it can be directly provided in the user interface. Alternatively, if the formula of the field is a mathematical function, the user input includes the various variables and operations for the formula. Similarly, if the formula is a search query, the user input includes the search string. In some examples, the formula may include one or more other fields. In this case, the one or more other fields may be presented to the user in the form of a drop-down menu or some other similar means for selection. Different schemes may be utilized for creating the names and/or field formulas. For instance, a scheme similar to Cascading Style Sheets (CSS) may be utilized for referencing the keys and formulas. Under this scheme, e.g., "*" can represent a universal selector (e.g., "item*" can be used to select all objects that have the word "item" in it). "." can be used to select all items in a class (e.g., ".itemGST" can be used to select all items within the itemGST class). "#" can be used to select a particular field by its key/name (e.g., "#total" can be used to select the field Total).

In some embodiments, when creating the field, the author can also set permissions via a permissions field. The permissions field can be used to indicate who can view/edit/delete the field. Permission can be set to global permissions (so that anybody can engage with the field), organization level (so that all employees can engage with the field), team level (so that member of particular teams can engage with the field), or individual level (so that only specific individuals can engage with the field). Further, in some embodiments, permissions that are more refined can be applied—for example, anybody in the organization may be allowed to view a particular field, but only members of a particular team can edit the field and only the creator can delete the field. Once the required information is entered, the user may indicate that they have completed the task (for example by selecting a 'save' or 'proceed' button).

The client application 120A and/or 120B, at step 308, packages the information received via the user interface into a field descriptor. Table B below illustrates an example field descriptor. Although the descriptor is illustrated as a JSON file to illustrate information stored in the field descriptor, the relevant information need not be stored in a JSON file and could be stored in any appropriate format (e.g. a simple text file, an XML file, or a table).

TABLE B example field descriptor key: TEAM Epic Estimate
permissions:
    access: limited
    users: { }
    groups: { }
    roles: { }
formula: sum(product = "Jira" AND projectkey = "BAR" AND epic = "Foo" AND type = "Story-point-estimate"
Resource ID: 237219ekjs1
Project ID: 27ndkf48957
Create date: 2018-03-16T05:35:01+00:00
User ID: kf38256dj273

At step 310, the client application 120A and/or 120B forwards the field descriptor to the field management system 102. In the present method, this can be done by forwarding the descriptor to the product platform 104A, 104B, and/or 104C, which in turn forwards the field descriptor to the field management system 102.

Subsequently, the field management system 102 receives the field descriptor and unpacks the information in the descriptor to create a new record in its field data structure(s).

In certain embodiments, either the client application 120A and/or 120B or the field management system 102 determines whether the formula for the field has any errors before it is stored as a record. For example, if the formula is a mathematical function/equation, a determination may be made whether the formula follows basic mathematical rules (e.g., includes appropriate brackets, mathematical functions, etc.). In addition, a check may be made to detect any circular dependencies in the formula. Similarly, if the formula of the field is a search string, a check may be made to determine whether the search string follows basic search syntax and Boolean rules.

The method above describes a process wherein a user utilizes a client device (e.g., client device 108A and/or 108B) and product platform (e.g., product platform 104A, 104B, and/or 104C) to create a field. In other embodiments, product platforms such as JIRA or CONFLUENCE may automatically generate fields. For example, when a new CONFLUENCE page is created, CONFLUENCE may automatically parse the content of the page to identify and create one or more fields capturing information about the page such as page link, word count, outbound links, labels, authors, etc. Information about these fields can then be forwarded to the field management system 102 in a field descriptor for storing in a similar manner to that described above with respect to process 300. These automatically created fields can be used by users on any product platform 104A, 104B, and/or 104C and in any content editor 124.

Process for Inserting a Field in Content

Figure 4:
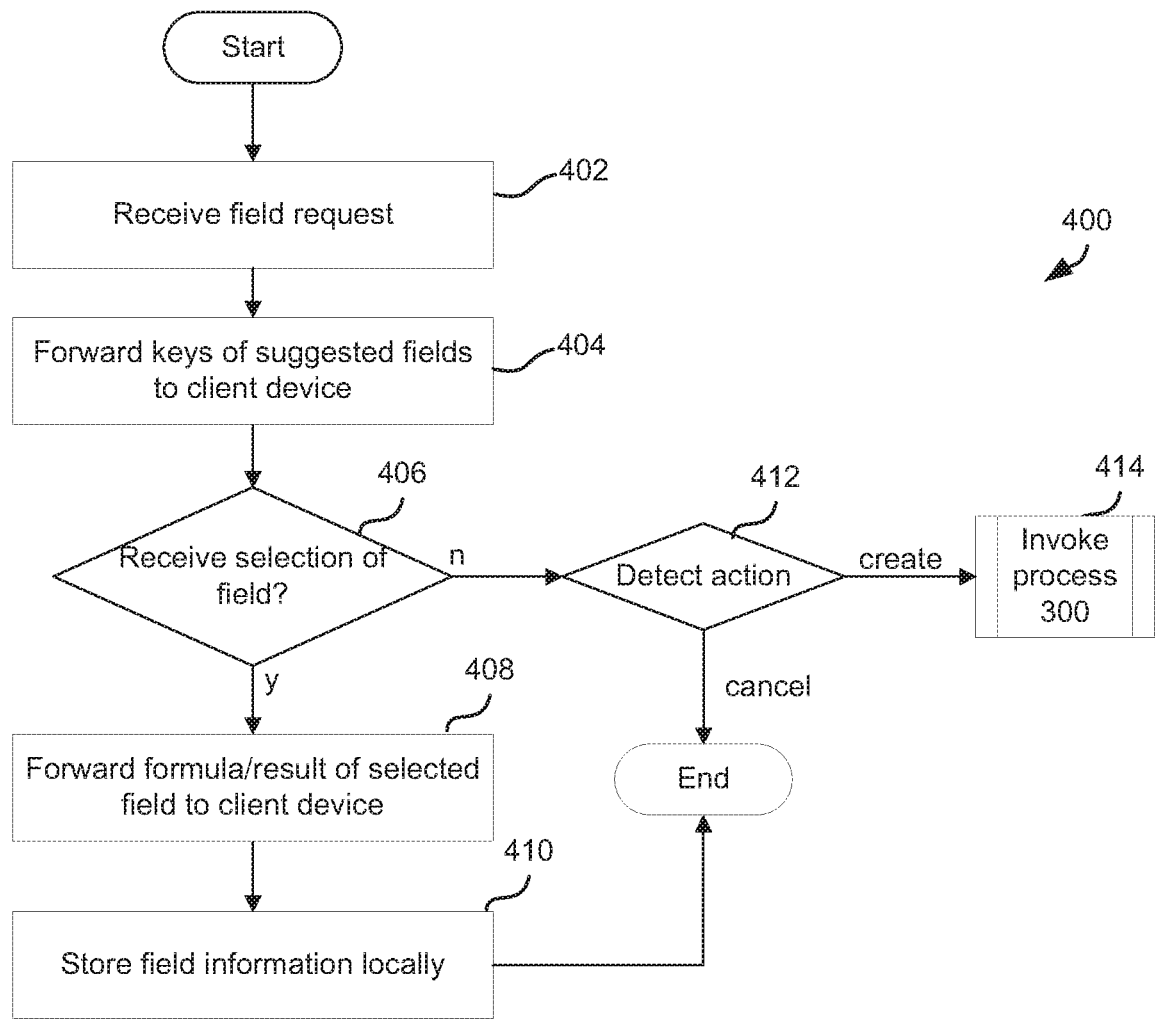
FIG. 4 is a flowchart illustrating a method for inserting a field in content according to some embodiments of the present disclosure.

FIG. 4 illustrates an exemplary method 400 for inserting a field in content on any application hosted by product platforms 104A, 104B, and/or 104C. The field may be inserted into content via a client application, such as client applications 120A and/or 120B and preferably, when a user is editing content in the client application via a rich content editor, such as content editor 124.

Method 400 begins at step 402, where a request for inserting a field is received at the field management system 102. This may happen in a number of different ways. In certain embodiments, the client application (e.g., the client application 120A and/or 120B) forwards a request to the field management system 102 (via the corresponding product platform 104A, 104B, and/or 104C) to invoke field insertion when an identification character is detected in the content editor 124. In one example, a user may be in the middle of creating content via the content editor 124 and may insert a special character or string of characters (which may be the same as the special character for invoking the field creation process or may be different) in the content editor 124. The client application (e.g., the client application 120A and/or 120B) recognizes this character or string of characters as being associated with a field insertion process. Consequently, it generates an insertion request and forwards this to the product platform (e.g., the product platform 104A, 104B, and/or 104C) (e.g., along with the client ID) and the product platform forwards this request to the field management system 102 (e.g., along with the product platform ID). In another example, the content editor 124 may include a graphical interactive element, such as an icon or button (representing a field), which may be activated to start the field insertion process.

At step 404, the field management system 102 forwards a list of one or more suggested fields to the requesting client device (e.g., the client device 108A and/or 108B) (via its corresponding product platform 104A, 104B, and/or 104C). In order to do this, the field management system 102 first identifies the list of fields it wishes to send to the client device 108A and/or 108B. Various techniques may be utilized to make this identification.

In one case, if no text is entered after the field insertion request is detected, the field management system 102 may generate a list of suggested fields based on a predetermined parameter. Example parameters may include most recent fields created by or used by the user (based on the user IDs and field ID in field data structure), most recent fields created by or used by the user's team or organization (based on the team ID and field ID in fields data structure), fields created for the same project ID and/or resource ID (based on project IDs and/or resource IDs in the field data structure), most popular fields for that project ID (based on count of field IDs in field data structure filtered by the project ID), and so on. One or more relevancy ranking algorithms may be used to rank the fields based on a predetermined parameter.

On the other hand, if text is entered after the request for field insertion is detected, the field management system 102 may be configured to suggest fields based on the entered text. For example, the client application (e.g., the client application 120A and/or 120B) may forward the entered text to the field management system 102 as and when it is detected. The field management system 102 in turn may be configured to compare the received text with its dictionary of key formulas to identify one or more fields that match the received text and in some cases, the project and/or resource ID associated with the requesting client device (e.g., the client device 108A and/or 108B). In certain embodiments, the field management system 102 is configured to forward keys for identified fields to the client application (e.g., the client application 120A and/or 120B) on a continuous basis as text is received.

For example, if the field management system 102 first receives the letters "st" it may compare these letters with the key names in the dictionary and identify a list of fields matching the letters, "st" and matching the resource or project ID associated with the client device 108A and/or 108B. If the field management system 102 then receives the letters "oc", the field management system 102 may conduct a further search in the list of identified fields to identify fields that match the letters, "stoc". This iterative searching and refining of identified fields continues until no more new text is entered by the user and received by the field management system 102.

It will be appreciated that this is just one technique for generating suggestions and various other techniques can be employed in addition or alternatively without departing from the scope of the present disclosure.

Once one or more matching fields are identified, the field management system 102 forwards the keys of the identified fields to the product platform (e.g., the product platform 104A, 104B, and/or 104C) for display on the client device (e.g., the client device 108A and/or 108B). Further, in some embodiments, the formula of the field may also be forwarded at this step. In order to forward this information, the field management system 102 may generate a file (e.g., a JSON or YAML file) that includes at least the keys of the one or more identified fields and may additionally include the formula, formula type, category, and permissions. These values are retrieved from the field data structure(s) maintained at the field management system 102.

Figure 5:
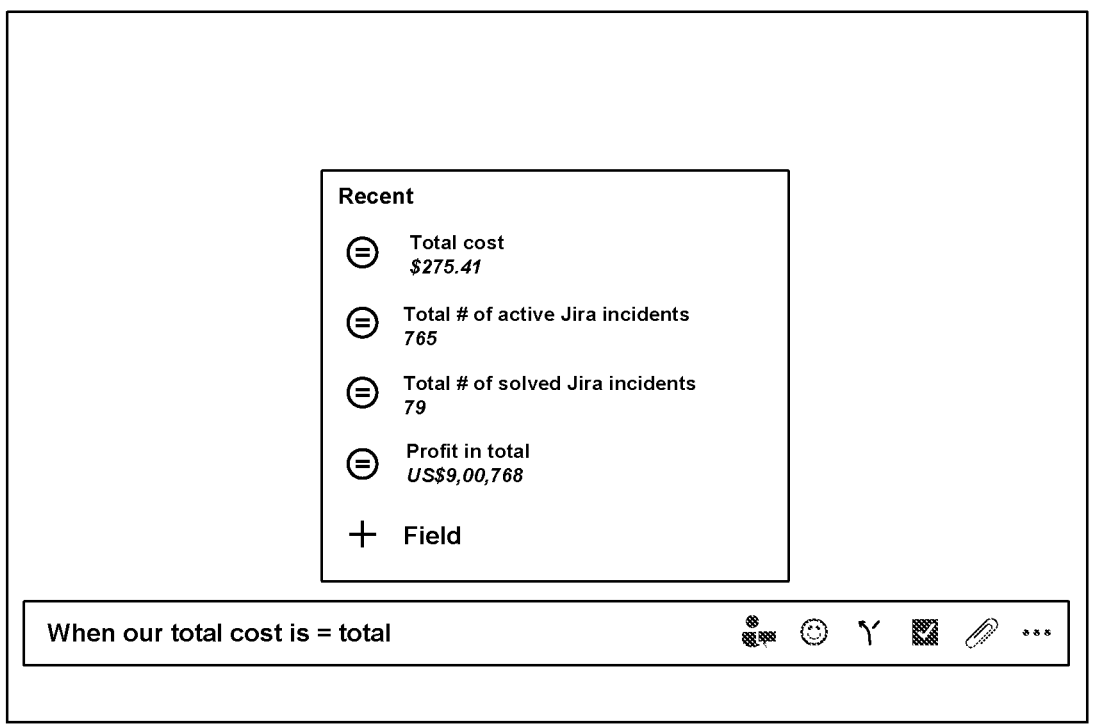
FIG. 5 illustrates a user interface depicting suggested fields according to some embodiments of the present disclosure.

FIG. 5 illustrates an example user interface 500 rendered at a client device (e.g., the client device 108A and/or 108B) for displaying a list of identified keys. In this example, the content editor 124 includes the text "when our total cost is =tota". Based on the text (and specifically, the letters TOTA), the field management system 102 has identified four fields having keys: "Total cost", "Total number of active Jira incidents", "Total number of solved Jira incidents", and "Profit in total". Further, in the illustrated example, the rendered user interface 500 displays the current results associated with the fields. In other embodiments, the user interface 500 may simply display the keys without the associated results. In other embodiments, instead of displaying the results, the user interface 500 may display the formulas associated with the fields instead of the results.

Returning to FIG. 4, at step 406 the client application (e.g., the client application 120A and/or 120B) determines whether a field is selected from the list of suggested fields displayed at the client device (e.g., the client device 108A and/or 108B) in the previous step. If it is determined that a field is selected, the method proceeds to step 408 where the client device (e.g., the client device 108A and/or 108B) is configured to replace the identification character (if present) and any text displayed after the identification character in the content editor 124 with the result of the formula associated with the selected field. For example, if a field with a simple formula is selected, the corresponding text/numerical value is displayed. Alternatively, if a field that has a complex mathematical function is selected, the formula is computed and the result of the computation is displayed. Similarly, if a field that has a query formula is selected, the query is executed and the search results corresponding to the query are displayed. In certain embodiments, the field management system 102 performs the computations and/or searches and provides the results to the product platform (e.g., the product platform 104A, 104B, and/or 104C, which forwards the results to the client device (e.g., the client device 108A and/or 108B).

Figure 6:
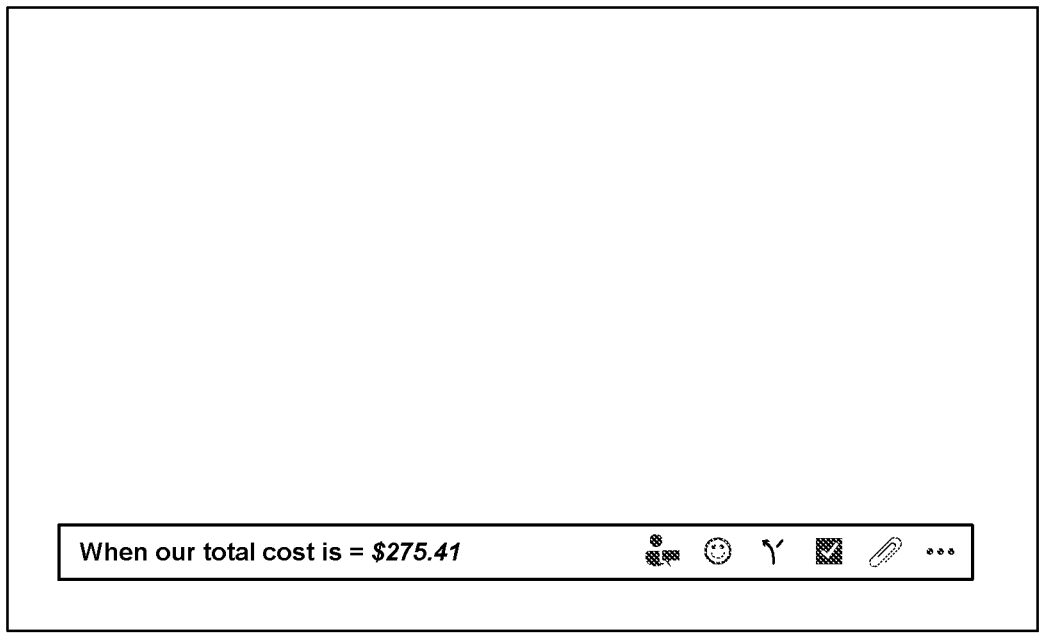
FIG. 6 illustrates a content editor user interface with a field inserted in content according to some embodiments of the present disclosure.

FIG. 6 illustrates the content editor user interface 600 when a particular field is selected. In particular, FIG. 6 illustrates the user interface 600 when the field "Total cost" from FIG. 5 is selected and the corresponding result of the formula associated with this field is rendered in the content editor.

In case the field management system 102 forwards the formula for the identified field to the client application (e.g., the client application 120A and/or 120B) at step 404, the client application may be configured to retrieve the formula from the received file and render it in the content editor 124. In case the file only includes the key for the field, this step (i.e., step 408) includes the further process steps of returning an identifier of the selected field to the field management system 102, the field management system identifying the corresponding field based on the identifier, computing a result for the formula associated with field and forwarding this along with the formula type, and permissions to the client application (e.g., the client application 120A and/or 120B). This information may be forwarded in the form of a field descriptor similar to the descriptor generated when the field is created (see Table B). Alternatively, the descriptor may simply include the field ID and result of the formula associated with the field.

In certain embodiments, when a particular field is selected (at step 406), it may be customized for that particular instance. Customization may include editing the permissions associated with the field and/or updating the formula of the field. Accordingly, once a field is selected at step 406, the client application (e.g., the client application 120A and/or 120B) may optionally render a field customization interface.

Figure 7:
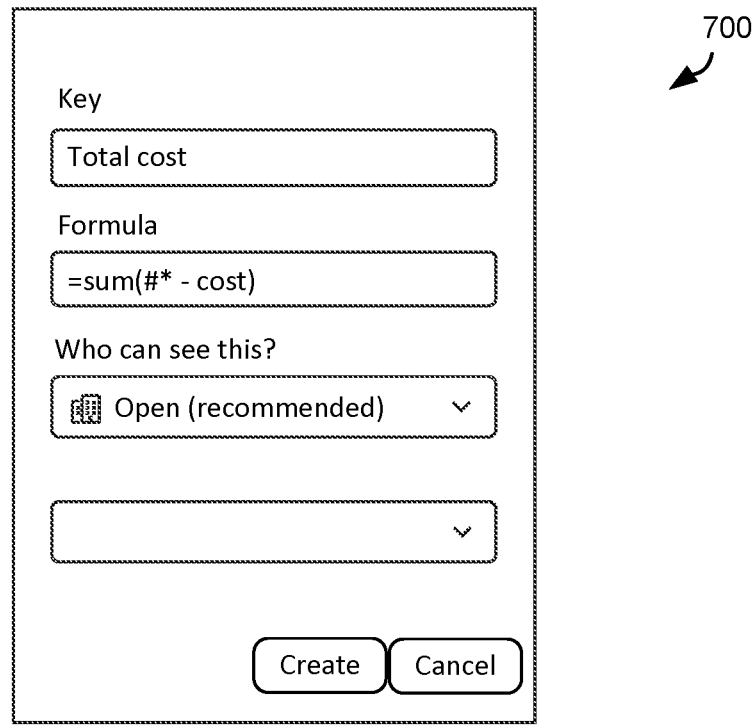
FIG. 7 illustrates a user interface for customizing a field according to some embodiments of the present disclosure.

FIG. 7 illustrates an example user interface 700. As depicted in this example, the user operating on the client device (e.g., the client device 108A and/or 108B) may be allowed to alter the permissions (depending of course on the user's own permissions), change the key of the field or change the formula of the field.

Finally, at step 410, information corresponding to the field is stored locally. The information stored locally may depend on local customization status. If a field is not customized, the client application (e.g., the client application 120A and/or 120B) and/or product platform (e.g., the product platform 104A, 104B, and/or 104C) may be configured to store the field identifier. Alternatively, if the field is customized, the client application (e.g., the client application 120A and/or 120B) and/or the product platform (e.g., the product platform 104A, 104B, and/or 104C) may be configured to store the local customization information (such as local permissions, and/or local formula).

When stored, the local field record may be linked to other information associated with that particular page (e.g., the page content or page metadata).

The information described above is persistently stored in the client application (e.g., the client application 120A and/or 120B) and/or product platform (e.g., the product platform 104A, 104B, and/or 104C) even after that particular instance has been closed on the client application (e.g., the client application 120A and/or 120B).

Further, at step 406 if a determination is made that the user has not selected any of the displayed keys, the method proceeds to step 412 where a determination is made to check if the user has performed any other function. The client application (e.g., the client application 120A and/or 120B) may be configured to perform this step.

There may be a number of reasons why a user may not select a particular field from the list of displayed elements. For example, the displayed list may not include the field the user is interested in and the user may wish to search for alternative fields. Alternatively, the user may decide that he/she does not wish to insert a field at this time. In still other cases, the user may decide that the field management system 102 does not include the field the user is interested in and the user may wish to create a new field at this stage.

If at step 412 a determination is made that a request for creating a new field is received, the method proceeds to step 414 where method 300 is invoked.

On the other hand, if at step 412 a determination is made that the user has simply cancelled the field insertion process (e.g., by closing the user interface displaying the list of fields or deleting the identification character), the method 400 ends.

As depicted in FIG. 5, the user interface that displays the list of retrieved fields may also provide an option to create a new field. Accordingly, method 400 may be interrupted at any stage after the list of suggested fields is presented to the client application (e.g., the client application 120A and/or 120B) if the field creation method 300 is invoked.

It will be appreciated that oftentimes processes 300 and 400 may be combined. That is, a user may create a field and immediately incorporate it in the content. In this case, once the field is created, the result of the formula associated with the field is computed and the result is displayed in the content editor. Users may be able to toggle between the formula and the result of the formula by using a keyboard shortcut or selecting a toggle icon present in the content editor.

Process for Loading Content with Fields

Figure 8:
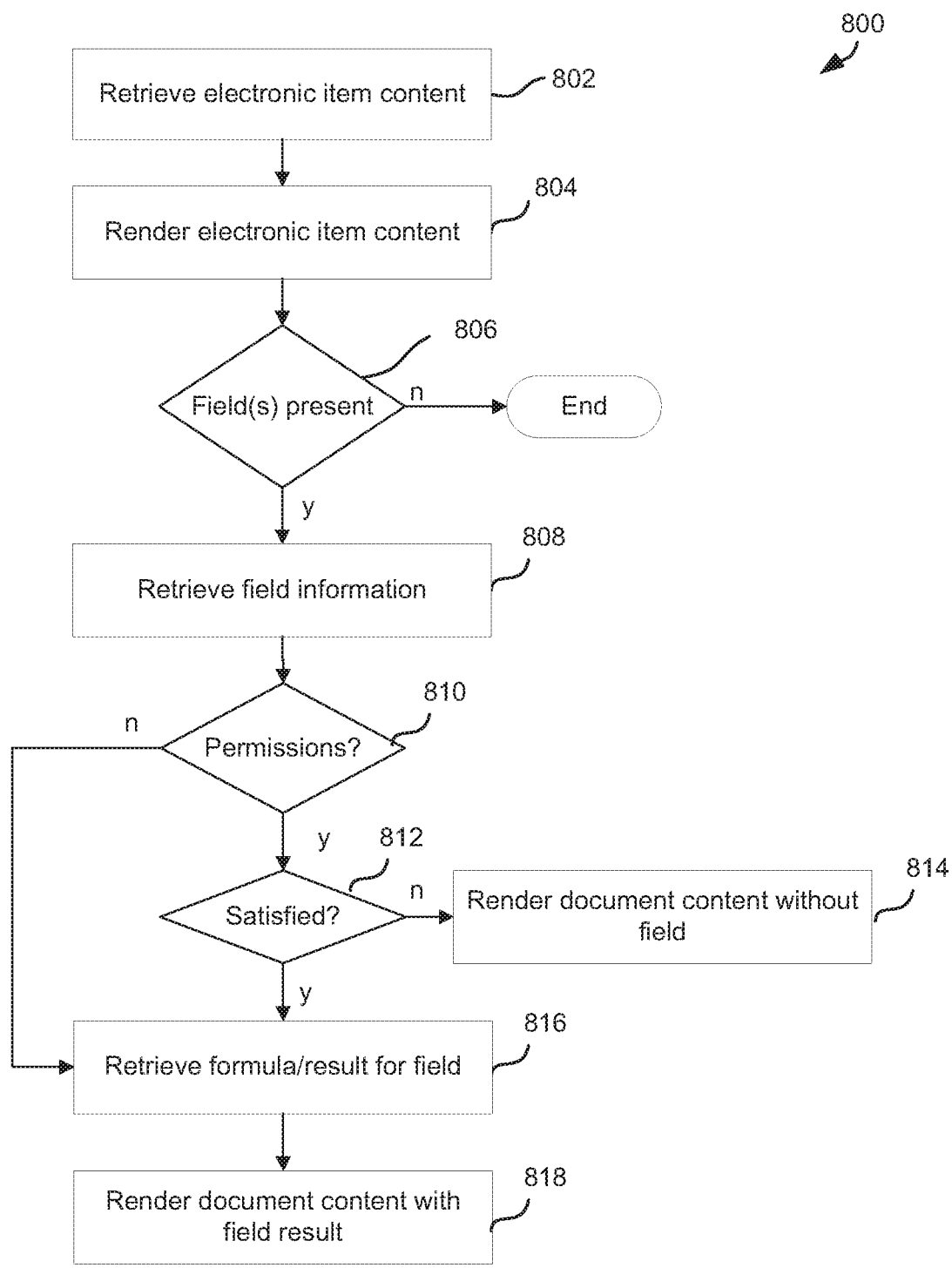
FIG. 8 is a flowchart illustrating a method for loading a document including a field according to some aspects of the present disclosure.

FIG. 8 illustrates an exemplary method 800 for rendering an electronic content item in a particular client application (e.g., the client application 120A and/or 120B). As used herein, the term electronic content item refers to any type of medium that includes content. Examples of documents include chat windows, webpages, blogs, websites, dashboards, a word processor document, etc.

The method 800 begins at step 802, where the client application (e.g., the client application 120A and/or 120B) retrieves content for the particular electronic content item. Depending on the type of electronic item, the content may be retrieved from various different sources. For example, content for a word processor document may be retrieved from a local database at the client device (e.g., the client device 108A and/or 108B) or from storage on the local intranet. Similarly, content for a webpage, blog, chat window, post may be retrieved from the corresponding product platform (e.g., the product platform 104A, 104B, and/or 104C).

At step 804, the client application (e.g., the client application 120A and/or 120B) renders the content. If the electronic item includes one or more field, the content around the fields may be rendered and placeholders may be displayed in the positions where the fields are supposed to be displayed.

Next, at step 806 the client application (e.g., the client application 120A and/or 120B) determines whether any fields are present in the electronic content item. In certain embodiments, this determination may be made based on a lookup for local field descriptors in the client application or product platform database. If it is determined that no fields are present in the electronic content item, the method 800 ends.

Alternatively, if at step 806 a determination is made that a field is present in the page content, the method proceeds to step 808, where the client application (e.g., the client application 120A and/or 120B) is configured to retrieve information about the field. As described previously, some of this information may be persistently stored in the client application/product platform, whereas other information associated with the fields may be stored only at the field management system 102. Accordingly, depending on where the information associated with the field is stored, the client application (e.g., the client application 120A and/or 120B) is configured to retrieve this information—e.g., in the form of a local descriptor (retrieved from the product platform (e.g., the product platform 104A, 104B, and/or 104C) or client application memory) and/or in the form of a field descriptor received from the field management system 102.

At step 810, a determination is made whether there are any permissions associated with the field. This can be done, for example, by analyzing the permissions field of a field descriptor. If there are limited permissions associated with the field, the method proceeds to step 812, where a determination is made whether the current user account (associated with the client application at the client device (e.g., the client device 108A and/or 108B)) is permitted to access the field.

If a determination is made that the user ID is not permitted to access the field at this step, the method 800 proceeds to step 814 where the client application is configured to render the document content without displaying the field. In some examples, an error placeholder (e.g., "access denied") may be displayed in place of the field.

Alternatively at step 812, if it is determined that the user is allowed to access the field, the client application (e.g., the client application 120A and/or 120B) is configured to retrieve the result for the field at step 816. In certain embodiments, to do this, the client application (e.g., the client application 120A and/or 120B) forwards the field identifier to the field management system 102 and the field management system 102 in turn computes the result of the formula associated with the field identifier and returns the result to the requesting client application (e.g., the client application 120A and/or 120B). In case the fields have formulas including other fields, the field management system 102 may compute the results of the dependent fields as well before forwarding the results to the requesting client device (e.g., the client device 108A and/or 108B).

Finally, the method proceeds to step 818 where the document content along with the result of the formula associated with the field is rendered on the display of the client device (e.g., the client device 108A and/or 108B).

Method 400 describes a process for inserting a field into content where the process commences when a request for inserting a field is received at the field management system 102—either when the user selects a graphical icon or a shortcut to add a field. As described previously, in some cases, a field may be inserted into content via other means—e.g., by copying a piece of content including a field from one source and pasting that copied piece of content in another document/content item. In such cases, method 400 may not be invoked. Instead, a hybrid of method 800 may be invoked. In particular, the client application 122 in which the content including the field is pasted, identifies the presence of the field, creates a new corresponding field, e.g., by automatically populating the information in the field descriptor shown in Table B, determines the formula of the field in the context of the content in which the field is pasted, and renders that formula/result of the formula. The newly created field descriptor may be forwarded to the server 114 for storage.

Further, in methods 400 and 800 the field formula is computed afresh when the field is inserted and when the content is rendered, respectively. As described previously, the field result is also refreshed when e.g., the formula of any of the fields referenced in the field changes. To do this, when a field is detected in content—e.g., when it has been inserted or when content is rendered that includes one or more fields, the client application 122 requests a subscription service from the server 114 to inform the client application 122 whenever any of the one or more identified fields are updated. The server 114 can then "push" any changes made to the one or more identified fields to the client application 122. The client application 122 in turn can update its local cache and re-compute the formula of any of the field that have changed and/or that reference the updated field. In this manner, the fields may reflect the current result/formula of the field. In another embodiment, the client application 122 may not request a subscription service. In this case, the field results may only be updated when the page is refreshed as that re-invokes method 800.

Process for Computing the Result of a Field

As described previously, when a field is created, inserted in content, or a page including content is loaded, the result of the field is computed. Further, in some cases, the result of a field is re-computed. This may occur, e.g., because a user has amended the formula of the field, content including the field has been refreshed, an application or product has updated the formula of the field, or the field includes variables that change over time and need to be refreshed.

Figure 9:
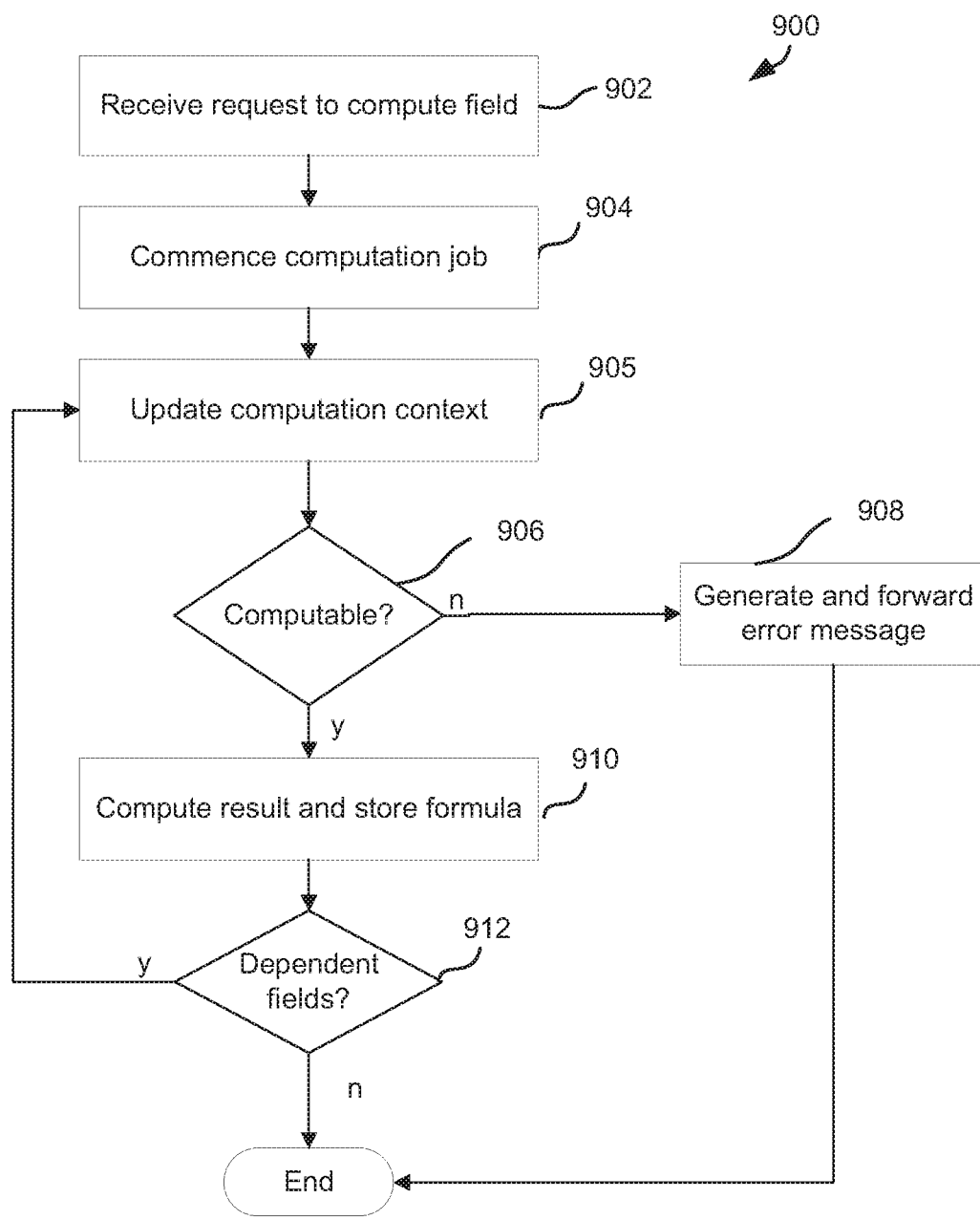
FIG. 9 is a flowchart illustrating an example method for computing a field formula according to some aspects of the present disclosure.

FIG. 9 illustrates an example method for computing or recomputing the result of a field according to some aspects of the present disclosure. The method begins at step 902 where a request to compute the result of a field is received. A number of different events may trigger this step. For example, a user may create a new field or insert a field in content the user is creating. Alternatively, a user may load a document that includes fields. In other cases, a user may edit the formula of the field (either within the content or via a field management user interface). Alternatively, a product or application may update a field formula. In yet another scenario, a field may include a formula that updates over time—e.g., number of active incidents in an incident management system, number of completed tasks in a task management system, etc. In any of these events, a compute field request is created. In certain embodiments, this request is received at the field management system 102. For example, assume there are three fields—#itemA=3, #itemB=4 and #total=#itemA+#itemB. If a user updates the formula of #item A from 3 to 2, the client application (e.g., the client application 120A and/or 120B) creates a compute field request and forwards the request to the field management system 102. The field compute request may include an identifier of the field that needs to be calculated. In addition, in some embodiments, it may include an identifier of the user and/or the client application (e.g., the client application 120A and/or 120B) that created the request.

Next, at step 904, a computation job is commenced. This may include creating a computation context for the field. Generally speaking, computation context may be metadata relating to a specific computation job—including e.g., an identifier for the computation job, and an identified of the field being computed. In some embodiments, this may also include creating a stack data type for the computation job and/or initializing a cache to store any interim calculations performed to compute the result of the field.

At step 905, the computation context is updated based on the current field being computed. This may include, e.g., updating an identifier of the field that is currently being computed, removing the last field already computed from the stack data type and/or adding the identifier of the field that has to be computed next in the stack and/or cache.

At step 906, a determination is made whether the current field formula can be computed. This may involve, e.g., parsing the field formula and determining whether the formula is correct. For example, if the formula is a mathematical function/equation and the variables or functions of the formula have changed, the field management system 102 may determine whether the formula follows basic mathematical rules, does not include a circular dependency, etc. Similarly, if the formula is a search query, the field management system 102 may determine if the search query includes the appropriate search syntax and follows search string rules. If any errors are found at this step, the field management system 102 may create and forward an error message (e.g., to the client application 120A and/or 120B) at step 908 informing the user that there was an error in the formula for the field and it cannot be computed/updated). The method 900 subsequently ends.

Alternatively, if it is determined that the field formula can be computed, the method proceeds to step 910, where the formula and corresponding result is computed for the current field and the computed formula and result are stored in the database 112.

Next (at step 912), a determination is made whether the field has any dependent fields that also might need to be computed or recomputed once the formula of this field is computed. For instance, in the example above, #itemA has a dependent field #total=#itemA+#itemB. In some embodiments, to identify dependent fields, the field management system 102 may perform a lookup of the field identifier in the formulas of other fields stored in the database 112 to identify a match. If no match is found, i.e., if a determination is made that the field does not have any dependent fields, the method 900 ends.

Alternatively, if a determination is made that the field includes one or more dependent fields, the method proceeds to step 905, where the computation context and the currently computed field is updated. Thereafter, the process 900 is continued until no more dependent fields are identified and computed. It will be appreciated that this process may be performed in a nested manner. For example, if a field (e.g., field A) that triggered method 900 includes two dependent fields (e.g., fields B and C), the method 900 first determines whether field B can be computed, it then computes the result for field B (if possible) and determines if field B has any dependents. If any dependents are revealed, these are also computed in the manner described in steps 905-910. Once all the dependents of field B are computed, the field management system 102 proceeds to compute field C in a similar manner and so on.

If no further dependents remain to be computed, the method 900 ends.

As described previously, a check is made to determine whether the formula of the fields being computed includes any circular dependencies. To detect circular dependencies, the field formula that triggered the computation may be saved as a stack data type to record the current field being computed, plus a history of fields also being evaluated. For example, consider a piece of content includes three fields #a, #b and #c defined as #a=#b+#c, #b=7 and #c=4. If the user updates field #c to equal #a+5, the method 900 creates a computation job and a new computation context at step 904 identifying the current field as #c. Since the formula has dependents, at step 912, the method 900 proceeds to step 905 where the computation context is updated to identify field #a as the current field. Method steps 906-912 are then repeated. At step 912, the method 900 determines that field #a has dependent fields #b and #c. The field management system 102 then updates the computation context in step 905 again identifying field #b as the current field and the method proceeds through step 906 to step 910 where the field management system 102 computes the formula of field #b as 7. As there is another dependent field remaining (i.e., field #c), the method proceeds to step 905 where the current field (i.e., #b) then "pops" off the top of the stack, and the field management system 102 attempts to add the next dependent field of field #a (i.e., field #c) to the stack. However, as field #c is already present in the stack and has already been computed, the field management system 102 determines that the field formula for #c cannot be computed at step 906 and the method proceeds to step 908.

Field Management User Interface

In addition to creating and inserting fields, the presently disclosed systems and methods allow users to view and manage fields. This may be done via the field management application 122 on a client device (e.g., the client device 108A and/or 108B), which may render a user interface to display one or more fields that a user account has created or has permissions to edit.

A user may sign-in to the field management application 122. The client application 122 may subsequently forward user account information to the field management system 102. Using the user account information, the field management system 102 may retrieve a list of fields that the user account has created or has permission to view by performing a lookup with the user account ID in the field data structure. This information may be displayed in the rendered UI.

If the user selects any one of the fields displayed in the UI, more information about the field may be rendered. This may include current information such as permissions, formula, current result of computing the formula, date created, date last modified, etc. It may also include statistical information such as number of times the field has been used, date last inserted, list of teams/users accounts using that particular field, etc. The information required to render the additional information may be retrieved from the field management system 102 once the field is selected.

In addition to displaying field information, the user interface may also allow a user account to manage the fields for which they have editing permissions. For example, a user may be able to change the formula of a field, amend the permissions for a particular field, add or remove a field to or from a particular category, archive or delete any fields that have not been used in a specified period, etc.

Suggesting Fields

As described previously with reference to FIG. 4, the field management system 102 in certain embodiments suggests fields to the client application (e.g., the client application 120A and/or 120B) in response to receiving a request for inserting a field in line with electronic content. One technique for doing this is previously described—i.e., comparing any text entered after the request with a dictionary of key names. However, it will be appreciated that multiple other techniques may be employed in addition or alternatively.

For example, in certain cases, the field management system 102 may be configured to predict one or more fields the user may be interested in inserting based on the text entered in the content editor before the request for field insertion is detected. In this case, any text entered in the content editor 124 is forwarded to the field management system 102 for analysis and the field management system 102 utilizes one or more text or context analyses technique to identify related fields. For example, the field management system 102 may analyze the key names in the dictionary to identify one or more root words and/or synonyms. These identified root words and synonyms may also be stored in the dictionary in association with the corresponding field identifier. Subsequently, when text is received from the client application (e.g., the client application 120A and/or 120B), the field management system 102 may be configured to analyze the text to identify one or more nouns. It may then compare these nouns with the key names, root words, and synonyms stored in the dictionary. It will be appreciated that this is just one example technique for identifying fields based on context and any other such technique may be employed to identify fields the user may be interested in based on text entered in the content editor.

Furthermore, it will be appreciated that the field management system 102 may be configured to only suggest fields that the user is permitted to use and/or that are associated with the resource ID and/or project ID where the field needs to be inserted. To this end, the client application may forward the user account information, the project ID and/or the resource ID to the field management system 102 along with the request for inserting the field. The field management system 102 in turn may be configured to compare the received user account information with the permissions of the identified fields to determine whether the user account is allowed to access the fields. If the user account is not permitted to access one or more fields, these may be removed from the list of suggested fields before the list is forwarded to the client application for display.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method for inserting a field into electronic content, the method comprising:
    receiving, at a server of a field management system, a field insertion request initiated by a user input to a first software application hosted by a first product platform server, the user input received at a client device that is presenting electronic content using the first software application, the field management system configured to receive field insertion requests initiated by user inputs to multiple different software applications hosted by different product platform servers;
    identifying, in response to the field insertion request, one or more suggested fields from a set of fields stored by the field management system, the set of fields comprising a field created using a second software application, different from the first software application, and hosted by a second product platform server different from the first product platform server, each field of the set of fields comprising a key and a formula;
    transmitting, by the field management system to the client device, one or more keys of the one or more suggested fields for rendering the one or more keys in a user interface of the client device;
    receiving, at the server of the field management system, indication of selection of a key from the one or more keys;
    computing, by the server of the field management system, a result for the formula of the field associated with the selected key; and
    communicating the result from the server of the field management system for rendering in line with the electronic content at the client device.

2. The method of claim 1, wherein identifying the one or more suggested fields further comprises generating a list of the one or more suggested fields based on a predetermined parameter, the predetermined parameter including at least one of:
    a set of most recent fields created by or used by a user;
    a set of most recent fields created by or used by the user's team or organization;
    a set of fields created for a project ID and/or resource ID associated with the field insertion request; and
    a set of most popular fields for the project ID associated with the field insertion request.

3. The method of claim 1, wherein identifying the one or more suggested fields further comprises:
    receiving text associated with the user input; and
    comparing the text with a dictionary of key names stored in a database of the field management system.

4. The method of claim 1, wherein:
    the field insertion request is a first field insertion request;
    the user input is a first user input;
    the method further comprises receiving a second field insertion request initiated by a second user input to a second software application hosted by a second product platform server; and
    the second product platform server is different from the first product platform server.

5. The method of claim 1, wherein:
    the user input is a first user input;
    the user interface is a first user interface;
    the method further comprises:
        in response to the first user input, rendering a second user interface for retrieving field information from a user;
        receiving a second user input via the second user interface, the second user input including at least the key and the formula for the field;
    packaging the second user input received via the second user interface into a field descriptor; and
    forwarding the field descriptor to the field management system for storing in a field database.

6. The method of claim 5, wherein the field descriptor comprises a resource identifier of a resource in context of which the field is created, the resource identifier being automatically inserted by the first software application.

7. A field management system, comprising:
    one or more processors;
    one or more non-transitory computer-readable storage media storing:
        a database including a set of fields, each field comprising a key and a corresponding formula; and
        sequences of instructions which, when executed by the one or more processors, cause the one or more processors to:
            receive a field insertion request initiated by a user input to a first software application hosted by a first product platform server, the user input received at a client device that is presenting electronic content using the first software application, the field management system configured to receive field insertion requests initiated by user inputs to multiple different software applications hosted by different product platform servers;
            identify, in response to the field insertion request, one or more suggested fields from the set of fields stored in the database, the set of fields comprising a field created using a second software application, different from the first software application, and hosted by a second product platform server different from the first product platform server;
            transmit, by the field management system to the client device, one or more keys of the one or more suggested fields for rendering the one or more keys in a user interface of the client device;
            receive indication of selection of a key from the one or more keys;
            compute a result for the formula of the field associated with the selected key; and communicate the result for rendering in line with the electronic content at the client device.

8. The system of claim 7, wherein identifying the one or more suggested fields comprises generating a list of the one or more suggested fields based on a predetermined parameter, the predetermined parameter including at least one of:
a set of most recent fields created by or used by the user;
a set of most recent fields created by or used by the user's team or organization;
a set of fields created for a project ID and/or resource ID associated with the field insertion request; and
a set of most popular fields for the project ID associated with the field insertion request.

9. The system of claim 7, wherein identifying the one or more suggested fields comprises:
receiving text associated with the user input; and
comparing the text with a dictionary of key names stored in the database of the field management system.

10. The system of claim 7, wherein:
the field insertion request is a first field insertion request;
the user input is a first user input;
the instructions further cause the one or more processors to:
receive a second field insertion request initiated by a second user input to a second software application hosted by a second product platform server;
the second product platform server is different from the first product platform server; and
the second software application is different from the first software application.

11. The system of claim 7, wherein:
the user input is a first user input;
the user interface is a first user interface;
the instructions further cause the one or more processors to:
in response to the first user input, render a second user interface for retrieving field information from a user;
receive a second user input via the second user interface, the second user input including at least the key and the formula for the field;
package the second user input received via the second user interface into a field descriptor;
forward the field descriptor to the field management system for storing in a field database.

12. The system of claim 11, wherein the field descriptor comprises a resource identifier of a resource in context of which the field is created, the resource identifier being automatically inserted by the first software application.

13. A method for resolving a field in electronic content presented on a client device by a product platform, the method comprising:
receiving, at a first product platform server of the product platform, a first request for loading a first electronic item provided by a first software application hosted by the first product platform server, the first request received from the client device using the first software application;
retrieving a first content for the first electronic item, the first content comprising a field identifier for a field, the field created using a second software application that is different from the first software application and is hosted by a second product platform server of the product platform different from the first product platform server, the field comprising a formula and at least one field variable that changes over time;
forwarding the field identifier to a field management server of a field management system, the field management system including at least one database storing field data accessible by both the first product platform server and the second product platform server for rendering fields within electronic content provided by the respective first product platform server and the second product platform server;
receiving, at the first product platform server from the field management system, a determined first result for the field using the formula and the at least one field variable;
transmitting, by the first product platform server, the first result to the client device;
causing the first result to be rendered in line with the first content of the first electronic item in the first software application at the client device;
receiving, at the second product platform server, a second request for loading a second electronic item provided by the second software application hosted by the second product platform server, the second request received from the client device using the second software application;
retrieving a second content for the second electronic item, the second content comprising the field identifier for the field;
forwarding the field identifier to the field management server;
receiving, at the second product platform server from the field management system, a determined second result for the field using the formula and the at least one field variable;
transmitting, by the second product platform server, the second result to the client device; and
causing the second result to be rendered in line with the second content of the second electronic item in the second software application at the client device.

14. The method of claim 13, further comprising:
subsequent to the first and second results being determined and subsequent to a change to the at least one field variable, receiving, at the first product platform server from the field management system, a determined third result for the field using the formula and the change to the at least one field variable;
transmitting, by the first product platform server, the third result to the client device; and
causing the third result to be rendered in line with the first content of the first electronic content item in the first software application.

15. The method of claim 13, further comprising:
forwarding a user account identifier to the field management system along with the field identifier, the user account identifier associated with a user of the client device; and
in response to the user account identifier having access permissions that satisfy a field permission associated with the field, causing the first result of the formula to be transmitted to either the first product platform server or the second product platform server.

16. A product platform system comprising:
a first product platform server for hosting a first software application executable on a client device for presenting electronic content using the first software application, the first product platform server having a first set of processors and a first set of non-transitory computer-readable storage media storing sequences of instructions that when executed by the first set of processors cause the first set of processors to:

receive, from the client device, a first request for loading a first electronic item provided by the first software application;

retrieve a first content for the first electronic item, the first content comprising a field identifier for a field that is created using a second software application, the field comprising a formula and at least one field variable that changes over time;

forward the field identifier to a field management server of a field management system, the field management system including at least one database storing field data accessible by both the first product platform server and a second product platform server for rendering fields within electronic content provided by the respective first product platform server and the second product platform server;

receive, at the first product platform server from the field management system, a determined first result for the field using the formula and the at least one field variable; and transmit, by the first product platform server, the first result to the client device;

cause a first result for the field to be rendered in line with the first content of the first electronic item in the first software application at the client device; and the second product platform server for hosting the second software application executable on the client device, the second product platform different from the first product platform server, the second product platform server having a second set of processors and a second set of non-transitory computer-readable storage media storing sequences of instructions that when executed by the second set of processors cause the second set of processors to:

receive, from the client device, a second request for loading a second electronic item provided by the second software application;

retrieve a second content for the second electronic item, the second content comprising the field identifier for the field;

forward the field identifier to the field management system;

receive, at the second product platform server from the field management system, a determined second result for the field using the formula and the at least one field variable;

transmit, by the second product platform server, the second result to the client device; and cause a second result for the field to be rendered in line with the second content of the second electronic item in the second software application at the client device.

17. The product platform system of claim 16, wherein the sequences of instructions in the second set of non-transitory computer-readable storage media, when executed by the second set of processors of the second product platform server, further cause the second set of processors to:

subsequent to the first and second results being determined and subsequent to a change to the at least one field variable, receiving, at the second product platform server from the field management system, a determined third result for the field using the formula and the change to the at least one field variable;

transmit, by the second product platform server, the third result to the client device; and causing the third result to be rendered in line with the second content of the second electronic content item in the second software application.

18. The product platform system of claim 16, wherein the sequences of instructions in the first set of non-transitory computer-readable storage media, when executed by the first set of processors of the first product platform server, further cause the first set of processors to:

forward a user account identifier to the field management system along with the field identifier, the user account identifier associated with a user of the client device; and in response to the user account identifier having access permissions that satisfy a field permission associated with the field, causing the first result of the formula to be transmitted to either the first product platform server or the second product platform server.

19. The product platform system of claim 16, wherein the sequences of instructions in the second set of non-transitory computer-readable storage media, when executed by the second set of processors of the second product platform server, further cause the second set of processors to:

request the field management system to provide an updated result when the formula associated with the field identifier is updated;

receive the updated result from the field management system; and update the second result to display the updated result.

* * * * *